(12) United States Patent
Marchesotti (10) Patent No.: US 9,116,924 B2
(45) Date of Patent: Aug. 25, 2015

(54) SYSTEM AND METHOD FOR IMAGE SELECTION USING MULTIVARIATE TIME SERIES ANALYSIS

(71) Applicant: Xerox Corporation, Norwalk, CT (US)

(72) Inventor: Luca Marchesotti, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 315 days.

(21) Appl. No.: 13/740,442

(22) Filed: Jan. 14, 2013

(65) Prior Publication Data

US 2014/0198986 A1    Jul. 17, 2014

(51) Int. Cl.
G06K 9/36 (2006.01)
G06F 17/30 (2006.01)
G06K 9/00 (2006.01)
G06K 9/62 (2006.01)

(52) U.S. Cl.
CPC ...... *G06F 17/30274* (2013.01); *G06K 9/00684* (2013.01); *G06K 9/622* (2013.01); *G06K 9/6255* (2013.01)

(58) Field of Classification Search
None
See application file for complete search history.

(56) References Cited

U.S. PATENT DOCUMENTS

| | | | |
|---|---|---|---|
| 5,363,209 A | 11/1994 | Eschbach et al. | |
| 5,371,615 A | 12/1994 | Eschbach | |
| 5,450,217 A | 9/1995 | Eschbach et al. | |
| 5,450,502 A | 9/1995 | Eschbach et al. | |
| 5,581,370 A | 12/1996 | Fuss et al. | |
| 6,275,304 B1 | 8/2001 | Eschbach et al. | |
| 6,535,639 B1 | 3/2003 | Uchihachi et al. | |
| 6,628,843 B1 | 9/2003 | Eschbach et al. | |
| 6,718,051 B1 | 4/2004 | Eschbach | |
| 6,795,211 B1 | 9/2004 | Eschbach et al. | |
| 6,816,285 B1 | 11/2004 | Eschbach | |
| 7,188,310 B2 | 3/2007 | Schwartzkopf | |
| 7,274,822 B2 | 9/2007 | Zhang et al. | |
| 7,340,676 B2 * | 3/2008 | Geigel et al. | 715/716 |
| 7,350,236 B1 | 3/2008 | Silverbrook et al. | |
| 7,403,642 B2 | 7/2008 | Zhang et al. | |
| 7,711,211 B2 | 5/2010 | Snowdon et al. | |
| 7,778,469 B2 * | 8/2010 | Cooper et al. | 382/225 |
| 7,849,116 B2 | 12/2010 | Jacobs et al. | |
| 8,131,114 B2 | 3/2012 | Wang et al. | |
| 8,639,028 B2 * | 1/2014 | Spaeth et al. | 382/165 |
| 2002/0194260 A1 | 12/2002 | Headley et al. | |

(Continued)

OTHER PUBLICATIONS

Liu et al., "A Fast, Comprehensive Shot Boundray Determination System", IEEE International Conference on Multimedia and Expo, pp. 1487-1490 (4 pages total), Beijing, China, Jul. 2007.*

(Continued)

*Primary Examiner* — Brian P Werner
(74) *Attorney, Agent, or Firm* — Fay Sharpe LLP (57) ABSTRACT

An image selection method includes receiving a collection of images and optionally, filtering the collection of images. The filtering may include removing images that are near-duplicates of other images in the collection. A plurality of features is extracted from each of the images in the optionally-filtered collection. The optionally-filtered collection of images is considered as a time-ordered sequence of images and is segmented to form a sequence of segments. Each segment includes at least one of the images. The segmenting of the sequence of images is based on the extracted features and positions of the images in the sequence of images. Images from the segments are selected to form a sub-collection of the images.

21 Claims, 7 Drawing Sheets

(56) References Cited

U.S. PATENT DOCUMENTS

| | | | |
|---|---|---|---|
| 2003/0081842 | A1 | 5/2003 | Buckley et al. |
| 2006/0074771 | A1 | 4/2006 | Kim et al. |
| 2008/0306995 | A1 | 12/2008 | Newell et al. |
| 2008/0317358 | A1 | 12/2008 | Bressan |
| 2009/0024914 | A1 | 1/2009 | Chen |
| 2009/0232409 | A1 | 9/2009 | Marchesotti |
| 2009/0254830 | A9 | 10/2009 | Reid |
| 2010/0073396 | A1 | 3/2010 | Wang et al. |
| 2010/0104261 | A1* | 4/2010 | Liu et al. ............ 386/95 |
| 2010/0166321 | A1 | 7/2010 | Sawant et al. |
| 2010/0215279 | A1 | 8/2010 | Gao et al. |
| 2011/0129159 | A1* | 6/2011 | Cifarelli ............ 382/224 |
| 2012/0269441 | A1 | 10/2012 | Marchesotti |

OTHER PUBLICATIONS

Basseville, et al. "Detection of abrupt changes: theory and application" vol. 15, 1993, pp. 1-469.

Bleakley, et al. "The group fused lasso for multiple transition-point detection", Arxiv preprint arXiv:1106.4199, 2011, pp. 1-25.

Platt, et al. "Phototoc: Automatic clustering for browsing personal photographs" Microsoft Research TechReport No. MSR-TR-2002-17, 2002, pp. 1-21.

Datta, et al. "Image retrieval: Ideas, influences, and trends of the new age" ACM Computing Surveys, 40(2), Article 5, 2008, pp. 1-60.

Datta, et al. "Acquine: aesthetic quality inference engine—real-time automatic rating of photo aesthetics", Proc. MIR'10, Mar. 29-31, 2010, pp. 1-4.

Li, et al. "Automatic summarization for personal digital photos", Information, Communications and Signal Processing, 2003 and Fourth Pacific Rim Conf. on Multimedia. Proceedings of the 2003 Joint Conf. of the 4$^{th}$ Intl. Conf., Dec. 15-18, 2003, vol. 3, pp. 1536-1540.

Doulamis, et al. "A fuzzy video content representation for video summarization and content-based retrieval", 2000, Signal Processing, 80(6):1049-1067.

Li, et al. "Modeling and recognition of landmark image collections using iconic scene graphs" ECCV, vol. 8, 2008, pp. 1-14.

Dhar, et al. "High level describable attributes for predicting aesthetics and interestingness", IEEE Conf. on Computer Vision and Pattern Recognition, 2011, pp. 1657-1664.

Chu, et al. "Consumer photo management and browsing facilitated by near-duplicate detection with feature filtering", J. Vis Commun. Image R, 21 (2010), pp. 256-268.

Hu, et al. "Coherent Phrase Model for Efficient Image Near-Duplicate Retrieval", IEEE Transactions on Multimedia, vol. 11, No. 8, Dec. 2009, pp. 1434-1445.

Geigel, et al. "Using Genetic Algorithms for Album Page Layouts", *Multimedia, IEEE* 10.4 (2003): 16-27.

Harchaoui, et al. "A Regularized Kernel-based Approach to Unsupervised audio segmentation" *IEEE Intl. Conf. on Acoustics, Speech and Signal Processing*, 2009, pp. 1665-1668.

Li, et al. "Automatic Summarization for Personal Digital Photos", ICICS-PCM 2003, Dec. 15-18, 2003, pp. 1536-1540.

Ma, et al. "A Generic Framework of User Attention Model and Its Application in Video Summarization", IEEE Transactions on Multimedia, vol. 7, No. 5, Oct. 2005, pp. 907-919.

Simon, et al. "Scene Summarization for Online Image Collections", *ICCV 2007*, pp. 1-8.

Ngo, et al. "Video Summarization and Scene Detection by Graph Modeling", IEEE Transactions on Circuits and Systems for Video Technology, vol. 15, No. 2, Feb. 2005, pp. 296-305.

Isola, et al. "What Makes an image memorable?" IEEE Conf. on Computer Vision and Pattern Recognition, 2011, pp. 145-152.

* cited by examiner

SYSTEM AND METHOD FOR IMAGE SELECTION USING MULTIVARIATE TIME SERIES ANALYSIS

BACKGROUND

The exemplary embodiment relates to a system and method for selection of a representative subset of images from a collection. It finds particular application in connection with the generation of digital photo albums and will be described with particular reference thereto.

There is a growing market for digital photo albums that are printed as photo books by photofinishing companies. These are assembled collections of photographs in hardcopy form that are customized for displaying a user's photographs. When creating photo books from image collections, users can select photographs for creating the photo book as well as layouts, backgrounds, and so forth.

The first step towards the creation of a photo album is the selection of images to include in the album. This is typically performed manually by evaluating how representative each photo is as well as considering interesting characteristics, image quality, and so forth. However, the selection process can be very time-consuming for the client. As a consequence, photo books started online are often never completed and only a small proportion of the albums that the client would like to print are eventually printed.

It would be advantageous to have a method which performs this selection automatically. However, this is a complex, multifaceted problem because it involves aspects related to storytelling, multimedia analysis and retrieval, computer graphics and graphic design. Different clients also have different tastes and opinions concerning quality, colors, graphic solutions and interest level of a picture. The consequence is that many of the heuristics used by humans for picking images are extremely difficult to model. This is also true for the lack of data, level of noise, and complex dependencies between preference and semantic information.

Some success has, however, been achieved with modeling high-level image quality and interestingness. See, R. Datta et al., "Acquine: aesthetic quality inference engine—real-time automatic rating of photo aesthetics," MIR, 2010; S. Dhar, et al., "High level describable attributes for predicting aesthetics and interestingness," CVPR IEEE, pp. 1657-1664, 2011; R. Datta et al., "Image retrieval: Ideas, influences, and trends of the new age," ACM Computing Surveys (CSUR), 40(2), 2008; and P. Isola, et al., "What makes an image memorable?" IEEE Conf. on Computer Vision and Pattern Recognition (CVPR), pp. 145-152, 2011.

Representativeness has been widely studied in video analysis. Many summarization techniques are available to synthesize a video by its key-frames See, A. D. Doulamis, et al., "A fuzzy video content representation for video summarization and content-based retrieval," Signal Processing, 80(6):1049-1067, 2000; U.S. Pat. No. 6,535,639, entitled AUTOMATIC VIDEO SUMMARIZATION USING A MEASURE OF SHOT IMPORTANCE AND A FRAME-PACKING METHOD, by S. Uchihachi, et al.; C. W. Ngo, et al., "Video summarization and scene detection by graph modeling," IEEE Transactions on Circuits and Systems for Video Technology, 15(2):296-305, 2005; and Y. F. Ma, et al., "A generic framework of user attention model and its application in video summarization," IEEE Trans. on Multimedia, 7(5):907-919, 2005.

There has been little consideration of the case of image collections, however. The main approaches are designed to deal with specific content (e.g., landmarks). See, X. Li, et al., "Modeling and recognition of landmark image collections using iconic scene graphs," ECCV, vol. 8, 2008. Unfortunately, these approaches tend to use obsolete techniques or are not specifically designed for photo album applications. See, J. Li, et al., "Automatic summarization for personal digital photos," Information, Communications and Signal Processing, 2003.

There remains a need for an automated system and method which more closely approximate the selection process employed by users in choosing images from a collection.

INCORPORATION BY REFERENCE

The following references, the disclosures of which are incorporated herein by references in their entireties, are mentioned:

U.S. Pat. No. 6,535,639, entitled AUTOMATIC VIDEO. SUMMARIZATION USING A MEASURE OF SHOT IMPORTANCE AND A FRAME-PACKING METHOD, by Uchihachi, et al.; U.S. Pat. No. 7,188,310, entitled AUTOMATIC LAYOUT GENERATION FOR PHOTOBOOKS, by Schwartzkopf; U.S. Pat. No. 7,274,822, entitled FACE ANNOTATION FOR PHOTO MANAGEMENT, by Zhang, et al.; U.S. Pat. No. 7,340,676, entitled SYSTEM AND METHOD FOR AUTOMATIC LAYOUT OF IMAGES IN DIGITAL ALBUMS, by Geigel, et al.; U.S. Pat. No. 7,350,236, entitled METHOD AND SYSTEM FOR CREATION AND USE OF A PHOTO ALBUM, by Silverbrook et al.; U.S. Pat. No. 7,403,642, entitled EFFICIENT PROPAGATION FOR FACE ANNOTATION, by Zhang, et al.; U.S. Pat. No. 7,711,211, entitled METHOD FOR ASSEMBLING A COLLECTION OF DIGITAL IMAGES, by Snowdon, et al.; U.S. Pat. No. 8,131,114, entitled SMART PHOTOBOOK CREATION, by Wiley H. Wang, et al.; U.S. Pub. No. 20020194260, entitled METHOD AND APPARATUS FOR CREATING MULTIMEDIA PLAYLISTS FOR AUDIO-VISUAL SYSTEMS, by Headley, et al.; U.S. Pub. No. 20080306995, entitled AUTOMATIC STORY CREATION USING SEMANTIC CLASSIFIERS FOR IMAGES AND ASSOCIATED META DATA, by Newell, et al.; U.S. Pub. No. 20090024914, entitled FLEXIBLE METHODS FOR CREATING PHOTOBOOKS, by Chen, et al.; U.S. Pub No. 20090232409, entitled AUTOMATIC GENERATION OF A PHOTO GUIDE, by Luca Marchesotti, et al.; U.S. Pub. No. 20090254830, entitled DIGITAL IMAGE ALBUMS, by Reid, et al.; U.S. Pub. No. 20100073396, entitled SMART PHOTOBOOK CREATION, by Wang; U.S. Pub. No. 20120294514, entitled TECHNIQUES TO ENABLE AUTOMATED WORKFLOWS FOR THE CREATION OF USER-CUSTOMIZED PHOTOBOOKS, by Craig Saunders, et al.

BRIEF DESCRIPTION

In accordance with one aspect of the exemplary embodiment, an image selection method includes receiving a collection of images and optionally filtering the collection of images. The filtering includes removing images that are near-duplicates of other images in the collection. The method further includes extracting a plurality of features from each of the images in the optionally-filtered collection and, considering the optionally-filtered collection of images as an ordered sequence of images, segmenting the sequence of images to form a sequence of segments. Each segment includes at least one of the images and generally some segments include more than one image. The segmenting of the sequence of images is based on the extracted features and positions of the images in the sequence of images. Images from the segments are selected to form a sub-collection of the images. The segmenting may be performed with a computer processor.

In accordance with another aspect of the exemplary embodiment, an image selection system optionally includes filtering component for filtering an input collection of images, the filtering removing images that are near-duplicates of other images in the collection. A features extractor extracts a plurality of features from images in the optionally-filtered collection. A sequence segmentor considers the optionally-filtered collection of images as a time-ordered sequence of images and segments the sequence of images to form a sequence of segments, each segment comprising at least one image, the segmenting of the sequence of images being based on the extracted features and positions of the images in the sequence of images. Optionally, a representative image selector selects images from the segments to form a sub-collection of the images. A processor implements at least the features extractor and sequence segmentor.

In accordance with another aspect of the exemplary embodiment, an image selection method includes receiving a collection of images, filtering the collection of images, the filtering including removing images that are near-duplicates of other images in the collection. The method further includes extracting features from the images in the filtered collection and, considering the images as forming a time-ordered sequence, segmenting the sequence of images to form a sequence of segments, each segment comprising at least one image, the segmenting of the sequence of images being based on the extracted features. The segmentation includes identifying transition points in the sequence of images by optimizing a function which, over all images in the sequence, minimizes an error between normalized values of the features and a step function which is constrained to a maximum number of the transition points. Provision is made for images to be selected from the segments to form a sub-collection of the images. The segmenting may be performed with a computer processor.

DETAILED DESCRIPTION

Aspects of the exemplary embodiment relate to a system and method for automatically selecting a subset of images from a larger initial set of images. The method is particularly suited to photo album creation from an initial sequence of photographs. The album drafts can be edited by the user during or after generation of the subset in order to produce the desired final result.

The exemplary system and method will be described with particular reference to digital photo book generation. It is to be appreciated, however, that the method also finds application in a variety of photofinishing operations, such as printing of photo albums, calendars, and so forth, and also to the creation of marketing materials such as brochures, and in providing images for websites.

The exemplary method considers a set of images as a temporally ordered sequence of entities. This enable the use of a multivariate time series analysis technique for detection of change points which can be used to segment the sequence of images into a series of segments. In the exemplary embodiment, the multivariate time series analysis technique employed is a group fused lasso technique. This segmentation method selects the change points by minimizing the errors between a set of feature values and a step function over the sequence of images. The segmentation step may be performed after an initial selection of images in which near duplicates and/or other images, such as poor quality images, are removed from the set. The exemplary segmentation technique tends to group images which likely relate to the same event into the same segment. The final selection of images for the album, e.g., one per segment, can be performed automatically, or by a user.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

It is assumed that the set of images to be processed by the method form a time-ordered sequence, i.e., the first image in the set is the first image in time to have been captured and each subsequent image was captured at a later time than the preceding image in the sequence. This is a reasonable assumption where the images are all captured by the same image capture device, such as the user's camera, which is often the case when images are submitted to a web service that is established for photo album creation. In other embodiments, the sequence of images can be reordered to form a time-ordered sequence, based on time stamps in metadata associated with each image, if it is detected that the images are acquired from different sources. For example, the system may detect that some images are captured by different camera models.

Figure 1:
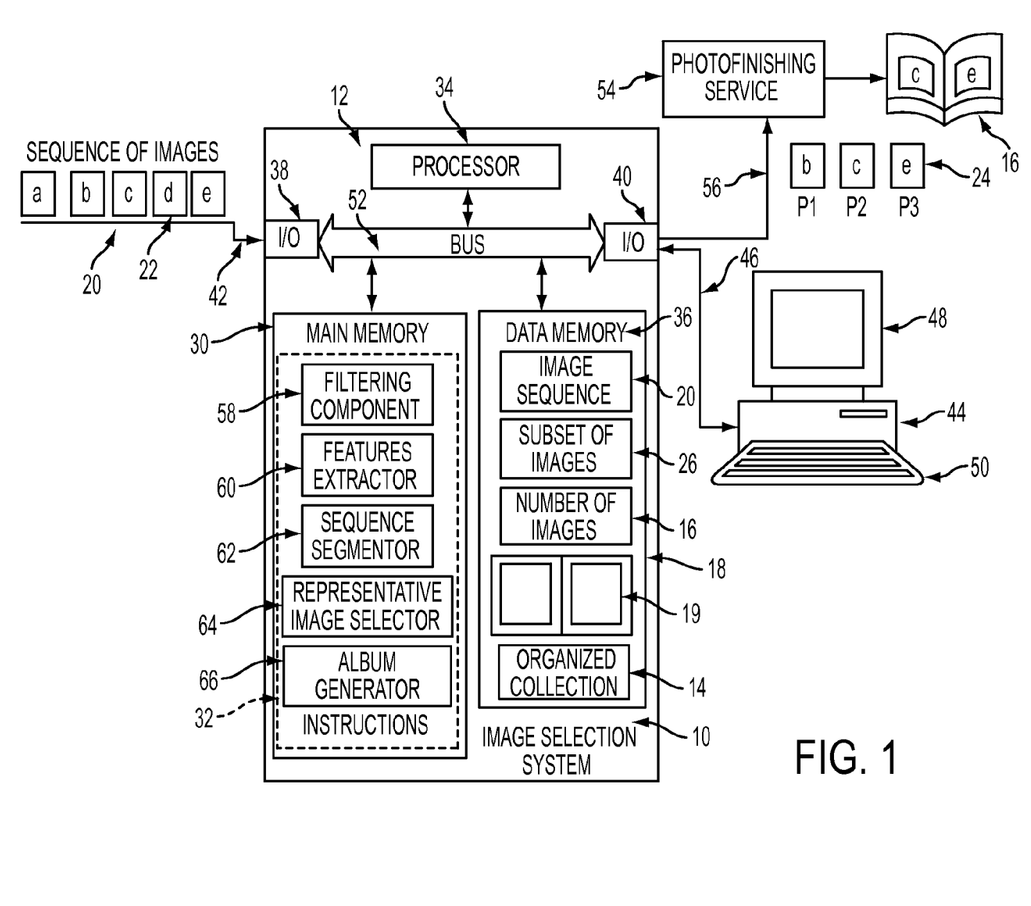
FIG. 1 is a functional block diagram of an image selection system in accordance with one aspect of the exemplary embodiment.

With reference to FIG. 1, a system 10 for image selection is illustrated. The system 10 may be hosted by one or more computing devices, such as the illustrated server computer 12, which hosts an image processing service, such as a photo album or calendar generating service. In one embodiment, users can upload or otherwise provide access to their images to a website that is hosted by the server computer or by a linked computing device, using a user interface generated on a client computing device. Through the interface, the user may select images for creation of an organized image collection 14, such as a photo album or calendar, in electronic form. The photo album/calendar may be subsequently printed in hardcopy form, e.g., as a photo book 16. In one embodiment, the user selects from a set of album templates 18, each template limiting the number of pages and/or images which may be used in forming the photo album. For example, each page of the photo album template may include one or more placeholders 19, each placeholder accepting only a single image. The user selects an initial collection (set) 20 of images 22 which are to be used to identify a sub-collection 24 of the images from the collection 20 which is to form the photo book 16.

The input collection 20 of images includes a larger number N of images 22 than the number M which will ultimately be used to form the digital album 14. For example the set 20 may include at least two, four, or ten times or more the number of images that a user would like to select as representative of an event sequence. As an example, the collection 20 may include at least 50 images and the subset 24 may include at least 10, but generally less than half the number of images in the collection. The exemplary system 10 aids the user in selecting a representative subset 24 of the images from the input set 20 to form the photo album. In the exemplary embodiment, a first subset 26 of images is first derived from the initial set 20 through an initial filtering process. This filtered subset 26 is then automatically segmented, e.g., by optimizing an objective function, such as with the group fused lasso technique. However, it is also contemplated that segmentation may be performed on the input set 20, i.e., without filtering the initial input set 20.

Figure 2:
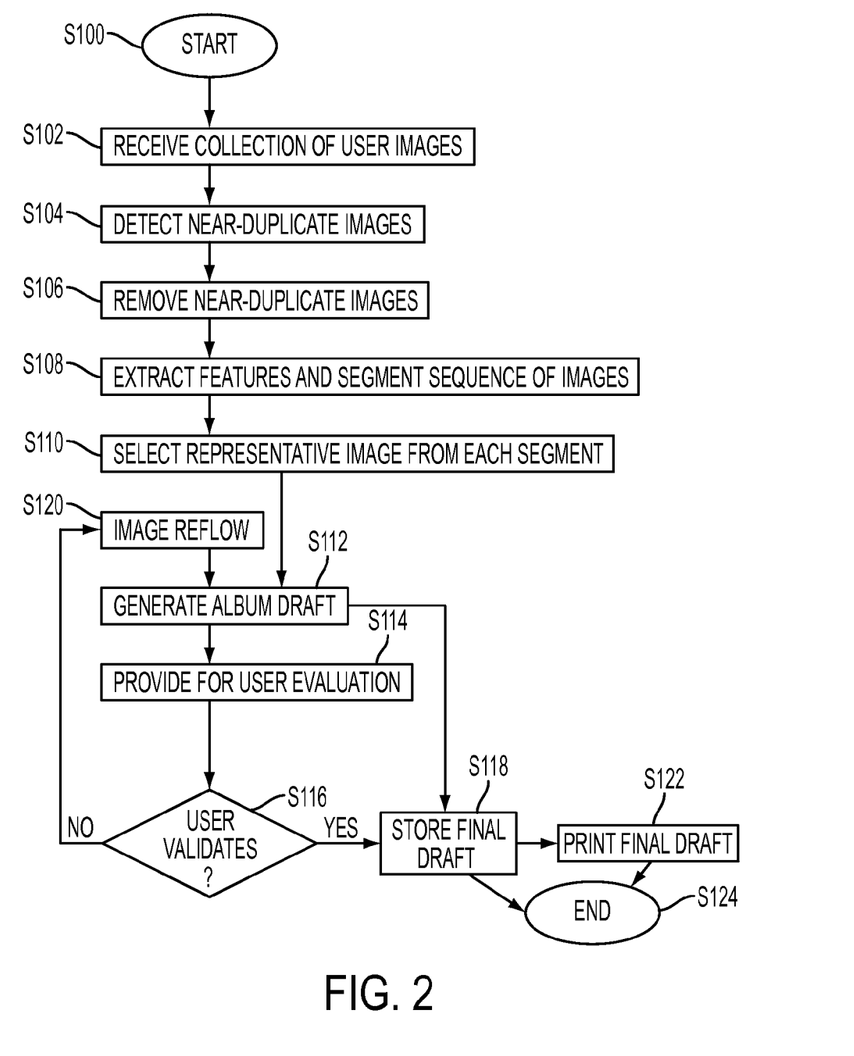
FIG. 2 is a flow chart of an image selection method in accordance with another aspect of the exemplary embodiment.

The exemplary system 10 includes main memory 30 which stores instructions 32 for performing the exemplary method shown in FIG. 2. A processor 34 in communication with the memory 30 executes the instructions. Data memory 36 of the system 10 stores the input set 20 of images or links thereto. Memory 36 may also store the templates 18 and information which associates images in the subset 24 with respective placeholders 19 of the digital photo book 14 generated using the template.

The system 10 includes one or more input/output devices 38, 40, for receiving and outputting user images and photo book information. Images 22 may be received by the system at input device 38 via a link 42. The subset 24 selected from the input set 20, or information identifying the subset 24, may be output from the system 10, via output device 40, e.g., to a client computing device 44 that is linked to the system via a link 46. The client device 44 may include a display device 48, such as a computer monitor or other pixilated screen configured for displaying images, such as an LED, LCD, or plasma screen. Using a user input device 50 of the client device 44, such as a keyboard, touchscreen, cursor control device, or combination thereof, a user may select and upload the set 20 of images from memory (not shown) of the client device 44 to the system 10 (or to an associated web portal), or identify the sequence 20 of images 22 from among those stored on a photosharing or social networking site accessible to the system 10. Hardware components 30, 34, 36, 38, 40 of the system 10 may communicate via a data/control bus 52.

The system 10 may also be linked to a photofinishing (printing) service 54 via a link 56. The printing service 54 outputs the photo book 16 in hardcopy format by printing or otherwise rendering the images 24 and other content of the photo book on a suitable print medium, such as sheets of paper, which are bound together to form the hardcopy photo book 16.

The exemplary instructions 32 include an optional filtering component, such as a near-duplicates detector 58, a features extractor 60, a sequence segmenting component (or segmentor) 62, a representative image selector 64, and optionally an album generator 66. These components may be separate or combined. In the exemplary embodiment, components 58, 60, 62, 64, 66 are in the form of software instructions implemented by the processor 34, although in other embodiments, they may be implemented as hardware components, and/or located on separate computing devices.

The near-duplicates detector 58 detects images in the initial set 20 that are duplicates or near-duplicates of each other (all of which will be referred to herein as near-duplicates for convenience). Component 58 may filter out images on other grounds, such as for low image quality. The detector 58 then and outputs the filtered subset of images 26 from which at least some of the near-duplicates in set 20 have been excluded.

The features extractor 60 extracts, for each image, a set of heterogeneous features, such as from 2-20 features per image, e.g. at least three or at least four different features, such as up to 10, e.g., about 5 features.

The sequence segmentor 62 receives the filtered subset 26 (or the initial set 20 where there is no prefiltering) as input. The segmentor 62 partitions the sequence 26 (or 20) to form a sequence of segments 70 (FIG. 3), based on the features extracted from the images. Each image 22 is assigned to one of the segments. Each segment 70 includes a time ordered sequence of one or more images such that the images 22 remain in the same order as in the original input set 20. Each segment 70 includes at least one image 22 and at least some of the segments include more than one image, such as two, three, four, ten, or more images, but fewer than the number of images in the set 26. The number of segments can be based on a user-selected value, e.g., based on a maximum or minimum number of placeholders for accepting images in an album template. For example, there may be at least 5, or at least 10, or at least 20 segments, and there may be up to 200 or 100 segments. The exemplary sequence segmentor 62 uses group fused Lasso to segment the image sequence 26, as described further below.

The representative image selector 64 selects a representative image 72 (FIG. 3) from each segment 70 (or from at least some of the segments). Alternatively or additionally, image selector 64 provides a representation of the images in the segment 70 for the user to select a representative image 72. The sequence of representative images 72 selected automatically and/or by the user forms the sequence 24 which may be autofilled into the template placeholders 19 by the album generator 66, either with or without user validation, and the resulting digital album 14 may be output from the system 10.

The computer(s) 12, 44 may each be a PC, such as a desktop, a laptop, palmtop computer, portable digital assistant (PDA), server computer, cellular telephone, tablet computer, pager, combination thereof, or other computing device capable of executing instructions for performing the exemplary method. In some embodiments, system 10 may be wholly or partially resident on the client device 44. For example, the system may be instantiated as a plug in software application or incorporated in a photo editing program, since the exemplary system does not rely on training a classifier or other computationally expensive processing steps.

The memory 30, 36 may represent any type of non-transitory computer readable medium such as random access memory (RAM), read only memory (ROM), magnetic disk or tape, optical disk, flash memory, or holographic memory. In one embodiment, the memory 30, 36 comprises a combination of random access memory and read only memory. In some embodiments, the processor 34 and memory 30 may be combined in a single chip. The network interface(s) 38, 40 allow(s) the computer to communicate with other devices via a computer network, such as a local area network (LAN) or wide area network (WAN), or the internet, and may comprise a modulator/demodulator (MODEM) a router, a cable, and and/or Ethernet port. Memory 30, 36 stores instructions for performing the exemplary method as well as the processed data 26, 14. Links 42, 46, 56 can each be wired or wireless connections, such as a local area network or wide area network, such as the Internet.

The digital processor 34 can be variously embodied, such as by a single-core processor, a dual-core processor (or more generally by a multiple-core processor), a digital processor and cooperating math coprocessor, a digital controller, or the like. The digital processor 34, in addition to controlling the operation of the computer 12, executes instructions stored in memory 30 for performing the method outlined in FIGS. 2, 3, and 4. Client computer 44 can be similarly configured to server computer 12 except as noted.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 3:
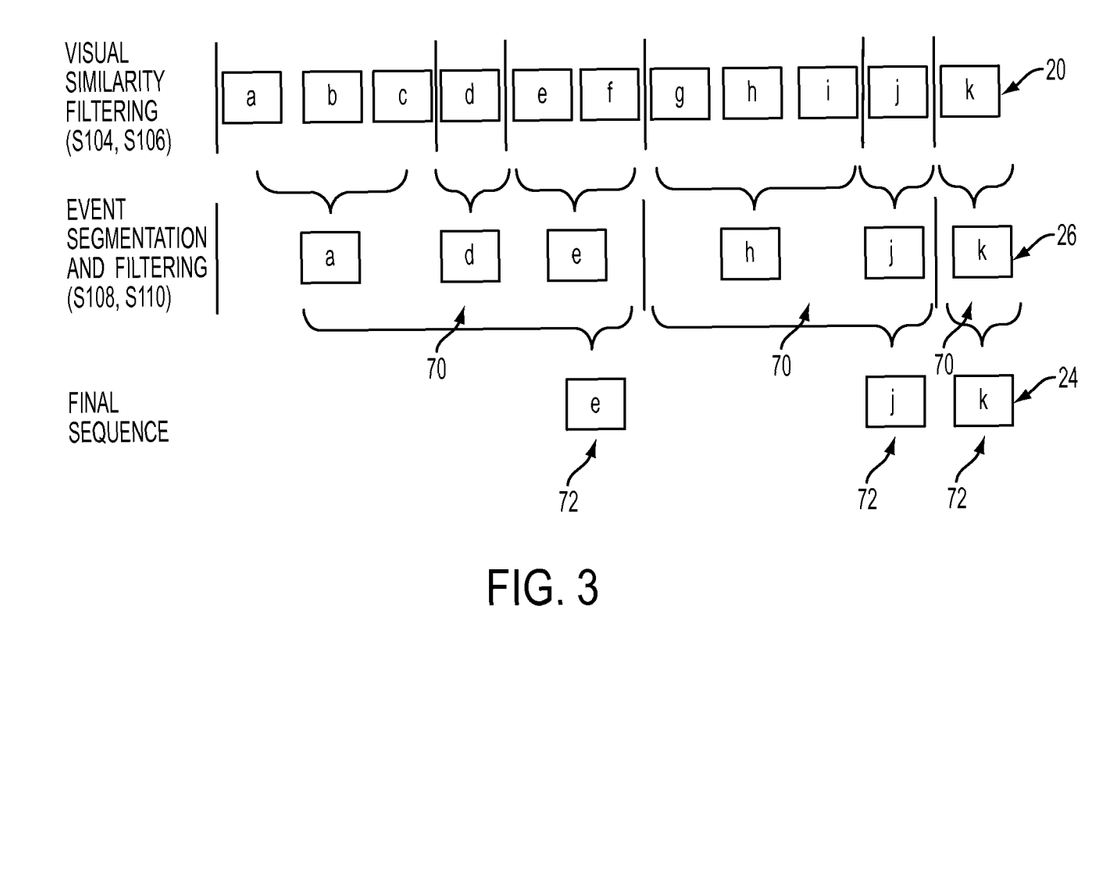
FIG. 3 illustrates selection of images from a sequence of images in which near-duplicate images are first filtered, scene segmentation is then performed, and a final selection is made.

FIG. 2 illustrates the exemplary method which can be performed with the system of FIG. 1. FIG. 3 graphically illustrates the image selection method for a small sequence of images in which near-duplicate images are first filtered out, then scene segmentation is performed and an additional selection step is performed.

The method begins at S100.

At S102, a set 20 of images is received.

Some preliminary image filtering may then be performed, for example, at S104, near duplicate images are detected, and at S106, near-duplicate images are removed from the set to generate a reduced set 26, e.g., by the near-duplicates detector 60.

At S108, the optionally filtered set 26 is considered as a time-ordered sequence of images and is segmented to form a time-ordered sequence of segments, e.g., by the sequence segmentor 62, based on features extracted from each of the images 22 and the respective positions of the images in the sequence.

At S110, a representative image 72 is selected for each segment, e.g., by the representative image selector 64. In one embodiment, exactly one image 22 is selected from each segment 70 to provide a time ordered subsequence 24. In other embodiments, an image is selected from each segment provided that this does not exceed the user's maximum M.

At S112, a draft album 14 may be generated, e.g., by the album generator 66. For example, the sub-collection 24 of images is automatically flowed into a sequence of placeholders 19 in a digital document, such as an album or calendar. At S114, may be presented to the user for validation and/or modification. If at S116, the user validates the album, the method proceeds to S118 where the draft album is stored. Otherwise, at S120, modifications may be made, e.g., by proposing one or more alternative images from the same segment for substituting for an image that the user has rejected. This may be an iterative process with the user validating each page in turn and optionally selecting images from different segments for substituting. Once the user has validated the images in the set 24, the method proceeds to S118. In an automated process, without validation, the method may proceed directly from S112 to S118.

At S122, the set 24 of images may be output and optionally sent for printing by a photofinishing service as a photo book 16, calendar, or the like.

The method ends at S124.

Further details on the system and method will now be provided.

It is assumed that the user has a personal image set 20 which is an initial set of images from which the user wishes to create a photo album (or brochure, or the like). This set of images is considered as an ordered sequence of elements. The exemplary approach is designed around the nature of the data. In photo album image sequences, many images are redundant because they are near-duplicate images taken on purpose to maximize the probability of getting a good shot, or they are related to the same subject or sub-event within the main event, but they add nothing to the story. For this reason, a two-step solution is advantageous for addressing these two practices sequentially. In the exemplary embodiment, near-duplicates detection and removal (S104, S106) is performed before segmentation (S108), although in other embodiments, the order could be reversed.

In what follows, it is assumed that an ordered set $I_{IN}=\{x_i, i=1\ldots N\}$ of input images is available, where $x_i \in X$ is an image descriptor for image i and X represents the space of image descriptors. The image descriptor is made up of a set of feature values. In the exemplary embodiment, a collection of heterogeneous features such as visual features, temporal features, geo-location features, photographic metadata, combinations thereof, and the like is used in representing each image 22. It is also assumed that $X=R^D$ is a D-dimensional descriptor space for these features, where R represents the set of real numbers, D representing the number of features in each image descriptor.

Let $I_{OUT}$ represent the output set 24 of the images that will be flowed into the album. As will be appreciated, the number of images to be flowed into the album is much less than the number N in the original set $I_{IN}$, specifically, $|I_{OUT}|=M<<N$, with M representing the target number of placeholders in the photo album, for example. M is generally the only parameter that needs to be pre-defined by the user, although some photo books may specify a maximum and/or minimum value of M or a default of M. M is often selected by the user based on the cost of the photo book. In some cases, a charge is made for each additional page beyond a preset minimum, up to a maximum number of pages. In the exemplary embodiment, a two-step method is used that performs two filtering operations to discard images to propose a subset of M images from the N original ones. The first step of near duplicates removal produces a set of images $I_{ND}$ (the set 26). The second step, segmentation, produces a set $I_{seg}$. A final selection from this set yields $I_{OUT}$ (set 24), where $I_{OUT} \subseteq I_{seg} \subseteq I_{ND} \subseteq I_{IN}$, such that $I_{OUT} \subseteq I_{seg} \subseteq I_{ND} \subseteq I_{IN}$.

Image Input (S102)

The images 22 in the sequence 20 of input mages($I_{IN}$) may be received by the system 10 in any convenient file format, such as JPEG, GIF, JBIG, BMP, TIFF, or the like or other common file format used for images and which may optionally be converted to another suitable format prior to processing. The image set 20 can be input from any suitable image source 44, such as a workstation, database, image capture device, such as a camera, memory storage device, such as a disk, or the like. The images may be individual images, such as photographs, although video images are also contemplated. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.).

The set of images is considered as a time-dependent sequence, with the first image in the set being treated as the first image in the sequence, and so forth throughout the set. Input images 22 may be stored in data memory 36 during processing, retaining information about the sequence order. For example, each image may be given a sequential identifier, such as a number, to denote its position in the sequence.

As will be appreciated, depending on the ultimate goal, the user submitting the images may be prompted to select an album template 18, as well as a maximum number M of images and/or pages to be included in the organized collection 14, or a default value and/or template may be selected by the system. The system may also require the organized collection 14 to include at least a threshold minimum number of images and/or pages to be included in the organized collection. For example, in the case of a calendar, the system may set twelve pages (one per month) and a threshold minimum of twelve images, one per page, as a default.

Near-Duplicates Detection (S104)

The aim of these steps is to identify images which are sufficiently similar in content to be considered near-duplicates of each other and to select only one of them. It often the case that the user may have taken multiple photographs of the same view in order to select the best one for including in an album.

Any suitable method for detecting similar images may be used for the detection step (S104). In the exemplary embodiment, a pairwise similarity assessment is used using, for example visual features and/or time stamps. In one embodiment, each image is described using an image representation (a feature vector, for example, a bag-of-visual words representation or Fisher vector), although other image representations may be employed, as discussed below. The image representation may include low-level feature descriptors, higher level features (e.g., semantic features, attributes), or a combination thereof. As an attribute, image creation time can be used, with images closely spaced in time having a higher similarity score for this feature. These time stamps are typically stored in the EXIF metadata format. The similarity between pairs of adjacent images in the sequence is computed using the representation. For example, the similarity between adjacent images may be computed using cosine similarity, dot product, or other similarity measure. In some embodiments, different features may be used separately to compute a similarity score and the resulting scores of the two or more features may be aggregated in some manner.

Two images may be considered near-duplicates if computed the similarity measure exceeds a predetermined threshold on similarity. In the illustration shown in FIG. 3, for example, the input sequence 20 of images includes images a-k, and is assumed to be in time order. Image a is compared with image b, image b with image c, and so forth such that each image, except the first and last, is compared with exactly two other images, the immediately preceding one and the immediately subsequent one. In the illustration, images a and b exceed the threshold on similarity as do b and c, but c and d do not, nor do d and e. The vertical lines in the first row in FIG. 3 indicate the points at which the threshold on similarity is not exceeded. Accordingly, images a, b, and c are considered near duplicates of each other (even though no direct comparison has been made between images a and c). This method thus collects together sequences of similar images, and does not permit the sequence to have gaps, for example, images a, b, and c can be in a sequence of similar images, but not a, b, c and e, since there is a gap of one (or more) images in the sequence.

Thus, given an image representation $x_i$ the method seeks to detect if the representation $x_{i+1}$ of the adjacent image is a near-duplicate of $x_i$ or not. Various methods are available for spotting transition points between dissimilar images. The following are suggested as exemplary:

1. Static Thresholding (ST-TH):

In this method, the derivative of the image representation $x_i$ is thresholded with a static threshold: $\dot{x}_i < th_s$. A threshold value of about 0.5 is exemplary. The derivative is the difference between two successive image representations: $x_{i-1} - x_i$, and could be output as a scalar value, for example by computing cosine similarity. In general a derivative of a signal measures the rate of growth of that signal.

2. Dynamic Thresholding (DY-TH):

In this method, the derivative is thresholded with an element-dependent threshold $\dot{x}_i < th_d(i)$, where:

$$th_d(i) = K + \frac{1}{2d+1} \sum_{k=-d}^{d} \log(\bar{x}_{i+k})$$

where K can be a suitable constant and d is a window size. As an example, K is arbitrarily set to log(17) and the window size d is chosen to be about 10. In this case, the threshold is an average of the derivative signal in an interval around the current sample image i.

See, for example, John C. Platt, et al., "Phototoc: Automatic clustering for browsing personal photographs," 2002, for further details of dynamic thresholding methods.

3. Non-Linear Classification (CLS):

In this method, a non-linear classifier $f(x_i, w)$ is trained using image representations and feature weights and a static threshold ($th_c = 0$) is applied.

Other methods for near-duplicate detection that may be used herein are described, for example, in Y. Hu, X. Cheng, L. T. Chia, X. Xie, D. Rajan, and A. H. Tan. Coherent phrase model for efficient image near-duplicate retrieval. Multimedia, IEEE Transactions on, 11(8):1434-1445, 2009; U.S. Pub. No. 20060074771, entitled METHOD AND APPARATUS FOR CATEGORY-BASED PHOTO CLUSTERING IN DIGITAL PHOTO ALBUM, by Kim, et al.; U.S. Pub. No. 20100166321, entitled METHOD AND SYSTEM FOR DETERMINING NEAR DUPLICATE IMAGES, by Sawant, et al.; U.S. Pub. No. 20100215279, entitled AUTOMATIC AND SCALABLE IMAGE SELECTION, by Gao, et al.; U.S. Pat. No. 7,849,116, entitled SYSTEM AND METHOD FOR AUTOMATED LAYOUT OF COLLABORATIVELY SELECTED IMAGES, by Jacobs, et al.; and U.S. Pat. No. 7,350,236, entitled METHOD AND SYSTEM FOR CREATION AND USE OF A PHOTO ALBUM, by Silverbrook et al.; the disclosures of which are incorporated herein by reference in their entireties.

Near-Duplicates Removal (S106)

Near-duplicates images may be discarded according to one or multiple criteria involving low-level image quality, such that for each group of near duplicates, only one image is retained (unless this would violate one of the thresholds, such as the minimum number M of pages/images). For example, the method outlined in U.S. Pub. No. 20120269441, published Oct. 25, 2012, entitled IMAGE QUALITY ASSESSMENT, Luca Marchesotti, et al., the disclosure of which is incorporated herein by reference in its entirety, can be used to assign an image quality value to each near-duplicate image in a group of two or more near-duplicate images and the image having the highest quality selected to proceed to the next step. In this method, image quality is based on aesthetic features and content features, which may be input to the same or separate classifiers. Other methods for determining image quality are described for example, in U.S. Pat. Nos. 5,363,209, 5,371,615, 5,450,217, 5,450,502; 6,275,304, 6,628,843, and 6,795,211, all to Eschbach, et al., U.S. Pat. Nos. 6,718,051 and 6,816,285 to Eschbach, and U.S. Pat. No. 5,581,370 to Fuss, et al., the disclosures of all of which are incorporated herein by reference in their entireties. High level Image quality assessment Other methods for selection of near-duplicates to be filtered out may alternatively be used. For example, a method similar to that described in Wei-Ta Chu and Chia-Hung Lin, "Consumer photo management and browsing facilitated by near-duplicate detection with feature filtering," Journal of Visual Communication and Image Representation, 21:256-268, April 2010, may be employed. In the method of Wei-Ta Chu, near-duplicate detection techniques are exploited to facilitate representative photo selection. To make the duplicate detection component 58 resistant to noisy features, three filtering approaches: point-based, region-based, and probabilistic latent semantic (pLSA) based, may be employed to categorize feature points. A support vector machine classifier may be constructed to model matching patterns between photographs and to determine whether photos are near-duplicate pairs. Relationships between photos are then described as a graph, and the most central photograph that best represents a photograph cluster is selected according to centrality values. This method is particularly suited to travel photographs.

As will be appreciated, steps S104 and S106 are optional and/or may be replaced with other methods for reducing the number of images, such as removing images that do not meet a predetermined image quality threshold, for example, because they are too bright or too dark, grainy, blurry, or the like. Blur may be determined, for example, by the gradient of the sharpest edge in the image and contrast by the distance of a histogram of the image from a uniform histogram. In other embodiments, image quality may be assessed after the segmentation step (S108).

Image Sequence Segmentation (S108)

The aim of this step is to segment the sequence $I_{ND}$ by identifying images portraying the same sub-event. In this step, transition points between different sub-events are identified. In FIG. 3, the transition points are identified by the vertical lines in the second row of images. Specifically, there is a transition point between images e and h and another between images j and k. The sequence is divided in a predetermined number of segments, one corresponding to each sub-event.

Sequence segmentation thus aims to identify transition points within the sequence delimiting each sub-event. The type of sub-events which may be present in a sequence of images depends on the type of album: for "Weddings", typical sub-events may include 1. Preparation, 2. Church before, 3. Church after the wedding, 4. Party, etc. In contrast, in a "Travel" album, different locations can give origin to different sub-events. Since the definition of a sub-event can be multifaceted, several heterogeneous features extracted from the image and from its metadata can be considered.

The exemplary segmentation technique has advantages over conventional methods for identifying a representative subset of images from a large image collection. Compared with manual selection techniques, it significantly reduces the time that the user may need to spend to select the image subset. It also differs from other automated image selection techniques that are based on clustering and which ignore the time ordering information. While group fused Lasso has been used in the context of bio-informatics, it has not been employed in the context of image analysis.

Figure 4:
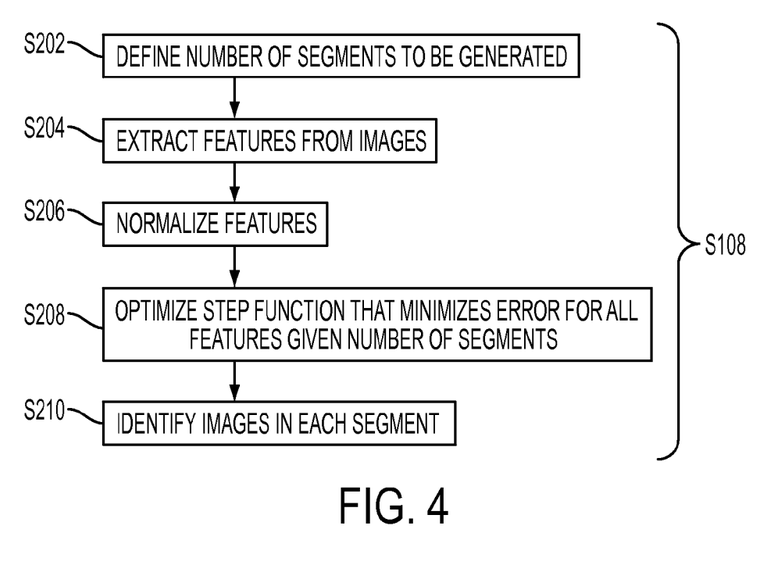
FIG. 4 illustrates aspects of the scene segmentation step of the method of FIG. 2.

FIG. 4 illustrates the segmentation method of step S108 in one embodiment.

At S202, a number M of segments to be generated is defined. For example, a user may have selected the number of images and/or pages to be included in the organized collection and this number may be input to the sequence segmentation component 62 as a target number M.

At S204, features are extracted from each image by the features extractor 60. The features may be extracted from the image data itself and/or from the metadata associated with the image data. In one embodiment, both these sources of features are employed. The exemplary method uses a plurality of different features such that a feature value is computed for each image for each feature. As examples, visual features, such as image similarity and image content (e.g., people and/or places that are determined to be present in the images), temporal and geo-location features, photographic metadata, and the like may be used. Temporal features may be derived from the time stamp at which the image was captured. Geo-location features may include or be based on the latitude and/or longitude at which the image was captured, or other geographic information. Photographic metadata may include one or more of exposure, focal length, and ISO level.

In one embodiment, the heterogeneous features can be considered capture the following information regarding the sub-event.

1. When?: time-stamp information, which may be derived from the image metadata-two images closely spaced in time 2. Where?: position information such as latitude and longitude (e.g., in degrees), derived from the image metadata 3. Who?: identity information (labels of people who are in the image, which may be manually applied or applied automatically using, for example facial recognition techniques and optionally at least some manually applied labels for people in the images; see for example, above-mentioned U.S. Pat. Nos. 7,274,822 and 7,403,642)

4. What?: visual similarity (this may be computed based on image signatures, e.g., by comparing the cosine similarity of two image signatures) and image content (which may be obtained by inputting the image signatures for images to a classifier which applies labels to the image selected from a set of labels, such as person, landmark, flower, etc.)

5. How?: EXIF tags (exposure, focal length, ISO level)

At S206, the features are normalized to provide feature values in a common feature space for all features. The feature space can have one, two or more dimensions. In the exemplary embodiment, all features are normalized in order to be able to jointly use them in the common framework. Normalization can be performed by sphering the values, e.g., by subtracting the mean feature value and dividing by the standard deviation of each feature. This provides feature values with an average of 0 per feature and which range between predetermined minimal and maximal values. The sequence of the n real valued features is referred to as the image profile. The p profiles are concatenated into a matrix X, where the i-th profile $X_{.,i} = X_{1,i}, \ldots, X_{n,i}$ is the i-th column of X.

At S208, transition points are identified which optimize a step function that minimizes the error between the normalized feature values and a segment's step value over all images and all features. In a step function, the function is piecewise constant, i.e., has the same value (or set of values in a multidimensional case) for each image in a given step (segment), then changes to a next value for the next segment at a transition point (jump) between two images in the sequence.

To find these transition-points, many methods are available. See, for example, M. Basseville, et al., "Detection of abrupt changes: theory and application," volume 15. Prentice Hall Englewood Cliffs, 1993, for a detailed review). In the exemplary embodiment, the Group Fused Lasso (GFL) technique is employed. See, for example, K. Bleakley and J. P. Vert, "The group fused lasso for multiple transition-point detection," Arxiv preprint arXiv:1106.4199, 2011. Fused Lasso techniques have been used in genomics and more generally in bio-informatics to solve a variety of different problems. Group fused Lasso (GFL) it is a recent extension of the mono-dimensional case where the optimal segmentation is expressed as the solution of a convex optimization problem. GFL has several advantages, such as theoretical guarantees of correct detection and high scalability (it can be implemented efficiently in O(NM) (where N is the number of images in the sequence and M is the number of segments, or placeholders available in the photo album).

The exemplary Lasso technique thus aims to identify optimal transition points in a step function fitted to the sequence of feature values that minimize the error between the constant value portions of the step function and the corresponding feature values and which is limited in the number of transitions, for example, the maximum number of transition points (jumps) permitted may be equal to M, and which may be subject to other constraints.

Lasso segmentation is based on the following approach: approximate the sequence X(i) with a step-wise constant function U by minimizing the number of jumps k:

$$\min_{U \in \mathcal{R}^n} \|X - U\|^2 \text{ subject to } \sum_{i=1}^{n-1} \delta(U_{i+1} - U_i) \leq k \quad (1)$$

In the most common formulation the number of jumps in the sequence is replaced by the convex total variation (TV):

$$\min_{U \in \mathcal{R}^n} \frac{1}{2}\|X - U\|^2 + \lambda \sum_{i=1}^{n-1} |U_{i+1} - U_i| \quad (2)$$

where U is the resulting step-wise constant function from which transition points can be deduced and $\lambda$ is a regularization parameter for a penalization term which penalizes large jumps and thus influences the number of jumps. In solving this objective function, $\lambda$ is tuned to satisfy the constraint on the maximum number of k.

It may be noted that the total variation of the function is the sum of the total variations on subintervals containing just one jump, which amounts to the sum of the sizes of the jumps.

Group fused Lasso extends this formulation to the multivariate case, where the features and the step function can have multiple dimensions. This is the case here where each image is represented with a vector $x_i$ which is composed of multiple values, hence is a multiple dimension (multivariate) vector. The method then includes solving an objective function as shown in Eqn. (3):

$$\min_{U \in \mathcal{R}^n} \frac{1}{2}\|X - U\|^2 + \lambda \sum_{i=1}^{n-1} \|U_{i+1,.} - U_{i,.}\| \quad (3)$$

This objective function minimizes (over all the images in the sequence and all the features), a regularization part (first term) which can be expressed in terms of a quadratic error between the step function U (e.g., in the form of a matrix) and the corresponding feature values of matrix X, and a penalization term (second term) which discourages large differences between adjacent steps, i.e. the difference between one constant value (or constant set of values in the multivariate case) of the step function $U_{i,.}$ and the next $U_{i+1,.}$ (the dot denoting that there can be a plurality of dimensions). The exemplary penalization term is formed by the sum of Euclidean norms of the increments of U. $\lambda$ is a regularization parameter, which is between 0 and 1, typically non-zero, and is selected so that the optimization of the objective function meets the constraint on k. When the regularization parameter $\lambda$ increases, increment vectors $U_{i+1,.} - U_{i,.}$ will be forced to zero making the stepwise approximation function smoother, i.e., increasing the number of steps.

For the functions in Eqns (2) and (3), the maximum number k of segments can thus be set by tuning the regularization parameter $\lambda$. Thus, an iterative process can be employed which selects an initial value of $\lambda$. The number of segments output by Eqn. (3) is determined. If it is larger or substantially smaller than the desired maximum number k, $\lambda$ is modified and the process is repeated until the method converges on the desired number of segments, e.g., slightly less than or equal to the user's selected value of k. The value of $\lambda$ which provides the desired number of jumps can be stored for use as an initial starting value for future image selection processes.

An advantage of the Lasso technique as described herein is that it only needs one parameter to operate, the value $\lambda$, which can be readily tuned.

The Group Fused Lasso algorithm, according to the method described in K. Bleakley and J. P. Vert, "The group fused lasso for multiple transition-point detection," Arxiv preprint arXiv:1106.4199, 2011, solves the optimization function in Eqn. 3 by testing promising solutions rather than attempting to test every possible solution of the objective function.

Image Selection (S110)

Once the transition points, and hence the segments, are identified, one or more images per sub-event are selected; they will populate the sequence $I_{seg}$ that will be presented to the user. Various heuristics are applied for selecting the most representative/highest quality/memorable image within each segment.

Methods for selecting a representative image in a set which can be used herein are described, for example, in U.S. Pub. No. 20110129159, entitled CONTENT BASED IMAGE SELECTION FOR AUTOMATIC PHOTO ALBUM GENERATION, by Cifarelli, the disclosure of which is incorporated by reference in its entirety. In this method, images from a segment are optionally clustered to form one or more clusters of images, each cluster of images having a similarity greater than a predetermined threshold. A density value of the data distribution within each cluster (or for the segment as a whole, if no clustering is performed) is estimated and at least one local maximum associated with each cluster is identified via a density function. At least one image from each cluster is selected, wherein each image is a candidate for the presentation.

The selection process may involve facial recognition. Facial recognition methods which may be used are described, for example, in above-mentioned U.S. Pat. No. 7,274,822.

Image quality may be used to filter out some of the candidate images in a segment, see for example, U.S. Pub. No. 2012/0269441, published Oct. 25, 2012, entitled IMAGE QUALITY ASSESSMENT, by Luca Marchesotti, et al., U.S. Pub. No. 2008/0317358, entitled CLASS-BASED IMAGE ENHANCEMENT SYSTEM, published Dec. 25, 2008, by Marco Bressan, et al., U.S. Pub. No. 2008/0278744, published Nov. 13, 2008, entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al.; U.S. Pat. Nos. 5,357,352, 5,363,209, 5,371,615, 5,414,538, 5,450,217; 5,450,502, 5,802,214 to Eschbach, et al., U.S. Pat. No. 5,347,374 to Fuss, et al., U.S. Pub. No. 2003/0081842 to Buckley, and U.S. Pat. No. 7,711,211 to Snowdon, et al., the disclosures of which are incorporated herein by reference in their entireties.

In another embodiment, crowdsourcing could be employed, e.g., by sending out the images in a segment to a set of human evaluators and asking them to select the most memorable or representative image for the segment and aggregating the votes. By sending out the segments to different sets of evaluators, a degree of confidentiality in the final sequence is maintained.

In other embodiments, the user is asked to select an image from each segment.

Images Flow and Album Validation (S112)

Images which arrived at this stage are flown into predefined album drafts.

Image Representations

For computing similarity between images in the detection of near-duplicates, any suitable image representation (sometimes referred to as a signature) may be employed, such as a vector that is a statistical representation of low level features extracted from patches of the image.

For example, the filtering component 58 includes a signature extractor including a patch extractor, which extracts and analyzes content related features of patches of the image 22, such as shape, texture, color, or the like. The patches can be obtained by image segmentation, by applying specific interest point detectors, by considering a regular grid, or simply by random sampling of image patches. Each patch includes a plurality of pixels and may include, for example, at least 16 or at least 64 or at least 100 pixels. The extracted low level features (such as vectors) from each patch can be concatenated to form a features vector which serves as the image signature. In other approaches, the feature vectors of an image are assigned to clusters. For example, a visual vocabulary is previously obtained by clustering low-level features extracted from training images, using for instance K-means. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc.), or the like. Given a new image 16 to be assigned a signature, each extracted feature vector is assigned to its closest visual word in the previously trained vocabulary or to all visual words in a probabilistic manner in the case of a stochastic model. A histogram is computed by accumulating the occurrences of each visual word. See, for example, the above-referenced patent documents and Perronnin, F., Dance, C., Csurka, G., and Bressan, M., "Adapted Vocabularies for Generic Visual Categorization," in *European Conf. on Computer Vision*, (2006); and Csurka, G., Dance, C., Fan, L., Willamowski, J., and Bray, C., "Visual Categorization with Bags of Key-points," in *ECCV Workshop on Statistical Learning for Computer Vision* (2004).

For other examples of methods for generating image signatures based on image content, see, e.g., U.S. Pub. Nos. 2007/005356, 2007/0258648, 2008/0069456, 2009/0144033, 2010/0092084, 2010/0189354, 2010/0318477, 2010/0098343, 2011/0026831, 2012/0143853; and Herve Jegou, Matthijs Douze, and Cordelia Schmid, "Improving Bag-Of-Features for Large Scale Image Search," in IJCV, 2010; Quelhas, P., Monay, F., Odobez, J.-M., Gatica-Perez, D., Tuytelaars, T., and Gool, L. V., "Modeling Scenes with Local Descriptors and Latent Aspects," in ICCV (2005), Carbonetto, P., de Freitas, N., and Barnard, K., "A Statistical Model for General Contextual Object Recognition," in ECCV (2004), and F. Perronnin, J. Sanchez, and T. Mensink, "Improving the fisher kernel for large-scale image classification," in ECCV 2010, the disclosures of all of which are incorporated herein in their entireties by reference.

The method illustrated in FIGS. 2 and 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 4, can be used to implement the image selection method.

As will be appreciated, the steps of the method need not all proceed in the order illustrated and fewer, more, or different steps may be performed.

Without intending to limit the scope of the exemplary embodiment, the following Examples demonstrate the effectiveness of the method.

EXAMPLES

Example 1

Segmentation of Images

Approximately 80 images were downloaded from an on-line Web album on the subject of tourism to serve as the input image set. In this example, no near-duplicates removal was performed. Five features were selected for the segmentation step: time-stamp, latitude, longitude, exposure, and focal length, and feature values were extracted from each image in the sequence. The feature values were normalized so that each feature had an average of 0 on a scale of −4 to +4.

Figure 5:
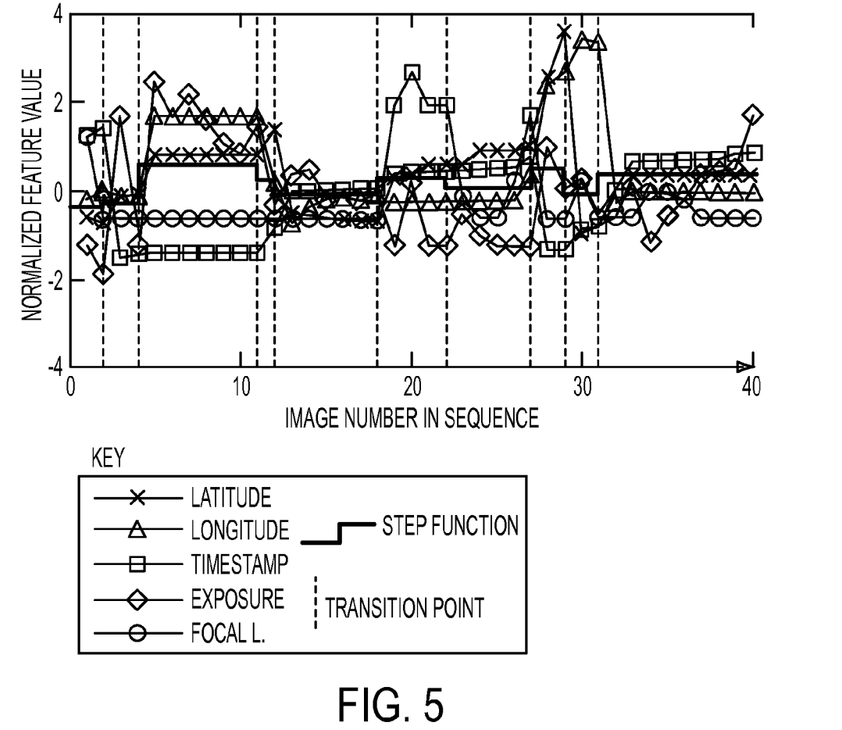
FIG. 5 shows a plot of normalized feature values for each of a set of five features: time-stamp, latitude, longitude, exposure, and focal length, for part of a sequence of images undergoing scene segmentation, with a step function fitted to the feature values with group fused lasso (vertical lines define the segments) for the first 40 photos obtained for an album containing 77 photographs.

In FIG. 5, the five profiles corresponding to features time-stamp, latitude, longitude, exposure, and focal length, respectively, are shown for part of the sample album. As it can be seen, these profiles share transition points (vertical dashed-lines). The results of group fused Lasso segmentation are identified by the dashed lines, the transition points. The step function which generated these transition points is shown to demonstrate the piecewise constant nature. As will be appreciated, the values of the steps on the normalized feature scale are not needed, only the transition points need to be identified. Each segment is defined as the sequence of frames (images) between two consecutive transition points. Some conclusions can be drawn by inspecting the result of the segmentation of the images themselves. First, it may be noted that, even if the method does not use any feature capturing visual similarity directly, for the most part, the segments contain images related to the same sub-event. Moreover, as expected, the feature for positional information captured by latitude and longitude works well, since this album is about tourism. EXIV data can become useful to fine-grained segmentation.

Example 2

Pairwise Similarity Assessment and Near-Duplicates Removal

Experiments were performed with several strategies for assessing the visual similarity between adjacent images. Given an image representation $x_i$ the aim was to detect if the adjacent image $X_{i+1}$ is a near-duplicate or not. Three strategies were considered for spotting transition point between dissimilar images: static thresholding, dynamic thresholding, and non-linear classification as discussed above.

Table 1 shows the comparison of the performances for the Static Thresholding (ST-TH) method evaluated on a data-set of 4 albums on two different features: visual similarity (sim) and time-stamp (tim). Ground truth data was manually generated by identifying transition points between adjacent images for a total of 1873 images. Each pair of images was annotated with a binary value (1=near-duplicates, 0=change point/dissimilar images). In the following:

Fn=number of False negatives;
Fp=number of False positives;
Tn=number of True negatives;
Tp=number of True positives;
Re=recall;
Pr=precision; and
F-m=harmonic mean of Pr and Re.

Precision is the proportion of retrieved instances that are relevant, and recall is the proportion of relevant instances that are retrieved.

TABLE 1

Quantitative comparison between near-duplicates removal based on dynamic and static thresholding

|  | F-m | Pr | Re | Tp | Tn | Fp | Fn |
|---|---|---|---|---|---|---|---|
| ST_TH (sim) | 0.73 | 0.64 | 0.86 | 92 | 217 | 50 | 15 |
| ST_TH (tim) | 0.64 | 0.50 | 0.86 | 93 | 176 | 91 | 14 |
| CLS (tim + sim) | 0.75 | 0.65 | 0.88 | 94 | 217 | 50 | 13 |

It was found that the best results can be obtained by combining sim and tim and using a binary classifier.

Experiments were also performed with the Dynamic Thresholding method, obtaining results equivalent to ST-TH for the timestamp feature. However the results for the visual similarity feature were poor for this example. To have a better understanding of this dichotomy in the results the similarity (sim) and timestamp signals (tim) along with the dynamic threshold were examined.

Figure 6:
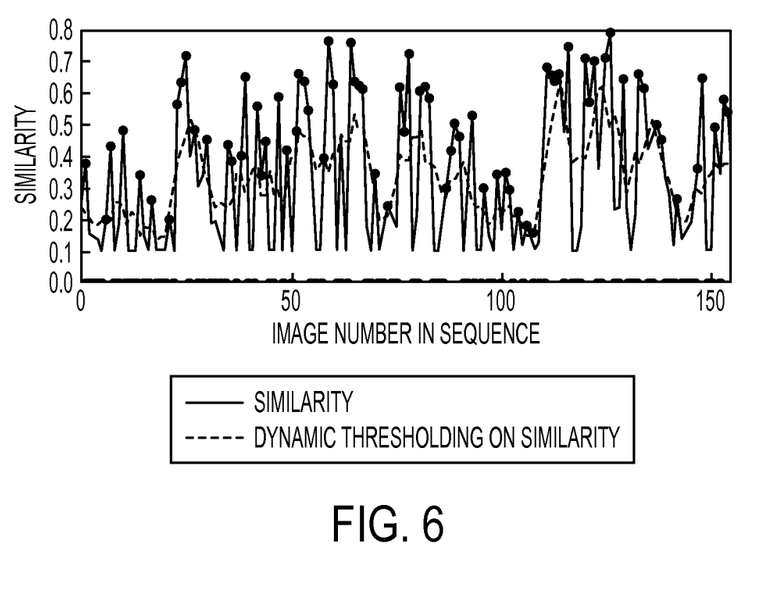
FIG. 6 is a plot of feature value (similarity) vs. image number in sequence for transition point detected by dynamic thresholding.
Figure 7:
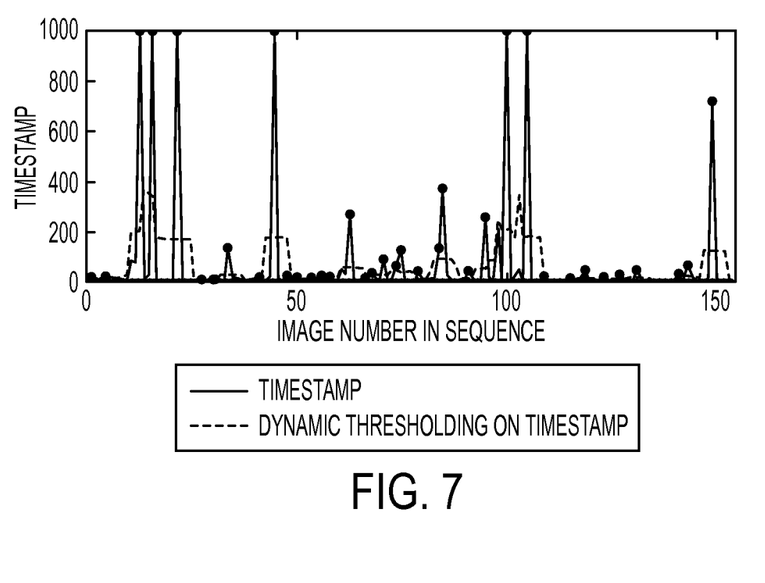
FIG. 7 is a plot of feature value (time) vs. image number in sequence for transition point detected by dynamic thresholding.

As it can be seen in FIGS. 6 and 7, which show the plots for only approximately the first 150 images in the collection, for ease of illustration, the timestamp signal is much more jittery than is the similarity signal, which makes the averaged threshold an optional method to filter out outlier measurements.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An image selection method comprising:
   receiving a collection of images;
   optionally, filtering the collection of images, the filtering comprising removing images that are near-duplicates of other images in the collection;
   extracting a plurality of features from each of the images in the optionally-filtered collection;
   with a processor, considering the optionally-filtered collection of images as an ordered sequence of images and segmenting the sequence of images to form a sequence of segments, each segment comprising at least one image, the segmenting of the sequence of images being based on the extracted features and positions of the images in the sequence of images, the segmenting comprising fitting a step function to the image sequence, the fitting comprising minimizing an error, over all the images in the sequence of images, between normalized values of the features for each image and corresponding values of the step function, the step function being constrained to a maximum number of transition points, each transition point corresponding to a change between step function values; and
   selecting images from the segments to form a sub-collection of the images.

2. The method of claim 1, wherein the segmenting of the sequence of images comprises optimizing an expression that minimizes the error while penalizing large differences between adjacent steps of the step function under a constraint which satisfies a maximum number of the transition points.

3. The method of claim 2, wherein the segmenting of the sequence of images is performed with Group Fused Lasso.

4. The method of claim 3, wherein the segmenting includes solving the expression:

$$\min_{U \in R^n} \frac{1}{2} \|X - U\|^2 + \lambda \sum_{i=1}^{n-1} \|U_{i+1} - U_i\| \quad (3)$$

where X is an nxm matrix, where n is the number of images in the sequence and m is the number of features;
U represents the step function;

$$\lambda \sum_{i=1}^{n-1} \|U_{i+1} - U_i\|$$

is a penalization term which discourages a large number of steps; and $\lambda$ is a regularization parameter, which is selected to meet the constraint on the maximum number of jumps.

5. The method of claim 1, wherein the feature extraction comprises normalizing the features to provide feature values in a common feature space for all features.

6. The method of claim 1, wherein at least one of the plurality of features is selected from the group consisting of:
temporal information;
geo-location information;
image content;
visual similarity;
photographic metadata;
and combinations thereof.

7. The method of claim 1, wherein the selecting images from the segments to form a sub-collection of the images comprises selecting a single image from each segment to form the sub-collection.

8. The method of claim 1, further comprising presenting the sub-collection of the images to a user for validation.

9. The method of claim 1, further comprising automatically flowing the sub-collection of the images into a sequence of placeholders in a digital document.

10. The method of claim 1, further comprising predefining defining a number of images to form the sub-collection and wherein the segmentation is also based on the predefined number.

11. The method of claim 1, wherein the method includes the filtering of the collection of images to remove images that are near-duplicates of other images in the collection.

12. The method of claim 11, wherein the filtering of the collection of images to remove images that are near-duplicates of other images in the collection comprises generating an image representation of each image and identifying similar images by at least one of static thresholding, dynamic thresholding, and non-linear classification.

13. The method of claim 1, wherein the selecting images from the segments to form a sub-collection of the images is performed with the processor.

14. A computer program product comprising a non-transitory recording medium storing instructions, which when executed on a computer, causes the computer to perform the method of claim 1.

15. A system comprising memory storing instructions for performing the method of claim 1 and a processor in communication with the memory for executing the instructions.

16. An image selection system comprising:
an optional filtering component for filtering an input collection of images, the filtering comprising removing images that are near-duplicates of other images in the collection;
a features extractor which extracts a plurality of features from images in the optionally-filtered collection;
a sequence segmentor which considers the optionally-filtered collection of images as a time-ordered sequence of images and which segments the sequence of images to form a sequence of segments, each segment comprising at least one image, the segmenting of the sequence of images being based on the extracted features and positions of the images in the sequence of images, the segmentation comprising identifying transition points in the sequence of images by optimizing a function which, over all images in the sequence, minimizes an error between normalized values of the features and a step function which is constrained to a maximum number of the transition points;
optionally, a representative image selector for selecting images from the segments to form a sub-collection of the images; and
a processor which implements at least the features extractor and sequence segmentor.

17. The image selection system of claim 16, further comprising and album generator which automatically flows the selected images into placeholders of a digital document.

18. The image selection system of claim 16, comprising the filtering component.

19. An image selection method comprising:
receiving a collection of images;
filtering the collection of images, the filtering comprising removing images that are near-duplicates of other images in the collection;
extracting features from the images in the filtered collection; and
with a processor, considering the images as forming a time-ordered sequence and segmenting the sequence of images to form a sequence of segments, each segment comprising at least one image, the segmenting of the sequence of images being based on the extracted features, the segmentation comprising identifying transition points in the sequence of images by optimizing a function which, over all images in the sequence, minimizes an error between normalized values of the features and a step function which is constrained to a maximum number of the transition points; and
providing for selection of images from the segments to form a sub-collection of the images.

20. The method of claim 16, wherein the images are individual photographs.

21. The method of claim 20, further comprising filling an album template with photographs from the sub-collection.

* * * * *